US005857167A

United States Patent [19]

Gritton et al.

[11] Patent Number: 5,857,167

[45] Date of Patent: Jan. 5, 1999

[54] COMBINED SPEECH CODER AND ECHO CANCELER

[75] Inventors: Charles W.K. Gritton, Sterling; Filiz Basbug, McLean, both of Va.

[73] Assignee: Coherant Communications Systems Corp., Ashburn, Va.

[21] Appl. No.: 890,964

[22] Filed: Jul. 10, 1997

[51] Int. Cl.[6] .................................. H04B 3/23; G01L 9/14

[52] U.S. Cl. ............................ 704/223; 704/219; 370/289

[58] Field of Search ..................................... 704/219, 223; 370/286, 289

[56] References Cited

U.S. PATENT DOCUMENTS

| | | | |
|---|---|---|---|
| 4,467,146 | 8/1984 | Lassaux | 379/339 |
| 4,644,108 | 2/1987 | Crouse et al. | 379/406 |
| 4,697,261 | 9/1987 | Wang et al. | 370/289 |
| 4,787,080 | 11/1988 | Yamakido et al. | 370/286 |
| 5,253,291 | 10/1993 | Naseer et al. | 379/406 |
| 5,371,853 | 12/1994 | Kao et al. | 704/223 |
| 5,396,488 | 3/1995 | Lähdemäki | 370/288 |
| 5,473,600 | 12/1995 | Liu | 370/286 |
| 5,491,771 | 2/1996 | Gupta et al. | 704/223 |
| 5,606,550 | 2/1997 | Jangi | 370/289 |
| 5,661,795 | 8/1997 | Maeda | 379/412 |
| 5,680,450 | 10/1997 | Dent et al. | 379/388 |
| 5,768,308 | 6/1998 | Pon et al. | 375/219 |

OTHER PUBLICATIONS

A.M. Kondoz and B. G. Evans, "A High Quality Voice Coder With Integrated Echo Cancellor and Voice Acitvity Detector for VSAT Systems," Proc. 3rd European Conference on Satellite Communications (ECSC–3), pp. 196–200, 1993.

Wilson, P.J., et al. "An Integrated Voice Codec and Echo Canceler", *Proceedings of ICASSP–86*, (IEEE 1986, pp. 1333–1336).

Wenshun, Tian, et al. "Integration of LD–CELP and Echo Canceler", *Proceedings of IEEE–Tencon '93*, (IEEE 1993), pp. 287–290.

*Primary Examiner*—David R. Hudspeth
*Assistant Examiner*—Tālivaldis Ivars Šmits
*Attorney, Agent, or Firm*—Dann, Dorfman, Herrell and Skillman, P.C.

[57] ABSTRACT

An parametric speech codec; such as a CELP, RELP, or VSELP codec; is integrated with an echo canceler to provide the functions of parametric speech encoding, decoding, and echo cancellation in a single unit. The echo canceler includes a convolution processor or transversal filter that is connected to receive the synthesized parametric components, or codebook basis functions, of respective send and receive signals being decoded and encoded by respective decoding and encoding processors. The convolution processor produces and estimated echo signal for subtraction from the send signal. In order to process the synthesized parametric components having distinct basis functions in the convolution processor, conversion means are provided for providing the receive-side parametric component to the processor, or for providing the estimated echo signal, in terms of the send-side parameter. Plural convolution processors are provided for processing respective parametric components of the desired coding scheme.

4 Claims, 2 Drawing Sheets

COMBINED SPEECH CODER AND ECHO CANCELER

FIELD OF THE INVENTION

The present invention relates to speech coding and echo cancellation in a telecommunication network. More particularly, the invention relates to an integrated speech coder and echo canceler for enhancing echo cancellation by accounting for speech coding distortion in an echo cancellation process.

BACKGROUND OF THE INVENTION

A desirable objective in the operation of a digital telecommunication network is to reduce the bit rate required to transmit speech signals. In a typical telephone network, speech signals are limited to a band of frequencies that is about 4 kHz wide. In order to digitally encode such speech signals, a sampling rate of 8 kHz is required by the Nyquist criterion. For acceptable fidelity, a resolution of about 16 bits per sample is required. Thus, a bit rate of about 128 kb/s would be needed to digitize telephonic speech.

In order to provide a maximum number of speech channels that can be transmitted through a band-limited medium, considerable efforts have been made to reduce the bit rate allocated to each channel. For example, by using a logarithmic quantization scale, such as in $\mu$-Law PCM encoding, high quality speech can be encoded and transmitted at 64 kb/s. One variation of such an encoding method, adaptive $\mu$-Law PCM (ADPCM) encoding, can reduce the required bit rate to 32 kb/s.

Further advances in speech coding have exploited characteristic properties of speech signals and of human auditory perception in order to reduce the quantity of data that needs to be transmitted in order to acceptably reproduce an input speech signal at a remote location for perception by a human listener. For example, a voiced speech signal such as a vowel sound is characterized by a highly regular short-term wave form (having a period of about 10 ms) which changes its shape relatively slowly. Such speech can be viewed as consisting of an excitation signal (i.e., the vibratory action of vocal chords) that is modified by a combination of time varying filters (i.e., the changing shape of the vocal tract and mouth of the speaker). Hence, coding schemes have been developed wherein an encoder transmits data identifying one of several predetermined excitation signals and one or more modifying filter coefficients, rather than a direct digital representation of the speech signal. At the receiving end, a decoder interprets the transmitted data in order to synthesize a speech signal for the remote listener. In general, such speech coding systems are referred to as a parametric coders, since the transmitted data represents a parametric description of the original speech signal.

Parametric speech coders can achieve bit rates of approximately 8–16 kb/s, which is a considerable improvement over PCM or ADPCM. In one class of speech coders, code-excited linear predictive (CELP) coders, the parameters describing the speech are established by an analysis-by-synthesis process. In essence, one or more excitation signals are selected from among a finite number of excitation signals; a synthetic speech signal is generated by combining the excitation signals; the synthetic speech is compared to the actual speech; and the selection of excitation signals is iteratively updated on the basis of the comparison to achieve a “best match” to the original speech on a continuous basis. Such coders are also known as stochastic coders or vector-excited speech coders.

Telecommunication signals are typically subjected to other signal processing functions in addition to speech coding. One such function is echo cancellation. In an echo canceler, an adaptive transversal filter is provided for estimating the impulse response of an echo path between a received signal and a transmitted signal. The received signal is convolved with the estimated impulse response to provide an estimated echo signal. The estimated echo signal is then subtracted from the transmitted signal to remove the echo component of the original transmitted signal.

When echo cancellation is performed in conjunction with speech coding, the performance of echo cancellation is impaired by the mismatch, at any given moment, between the excitation signals characterizing the encoded near-end speech and the excitation signals characterizing the far-end speech. While PCM-based echo cancelers can achieve an echo return loss enhancement of 30 dB or more, the use of CELP coding can reduce the performance of the canceler to an echo return loss enhancement of about 20 dB or less. One reason for such reduction in performance is that the estimated echo signal is determined as a function of the received signal, which is expressed in terms of the far-end excitation signal selected by the far-end CELP coder. The estimated echo signal is then subtracted from the transmitted signal, which, in turn, is based upon the current near-end excitation signal selected by the near-end CELP coder. Hence, the resulting echo-canceled signal will include a noise component attributable to differences between the near-end and far-end excitation signals.

SUMMARY OF THE INVENTION

In accordance with one aspect of the present invention, there is provided an echo canceler wherein an echo estimate is developed in terms of the received far-end excitation signal; and wherein the echo estimate is then re-expressed in terms of the current near-end excitation signal prior to being subtracted from the outbound signal for transmission to the far side.

In accordance with another aspect of the present invention, an echo canceler is configured to parametrically code a non-parametrically coded receive-input signal, to decode a parametrically-coded send-input signal and to cancel echo from the send-input signal. The echo canceler encodes the receive-input signal into a plurality of parametric components selected according to an analysis-by-synthesis process. Each parametric component comprises an excitation vector. Delay registers are provided for storing synthesized receive-input signals corresponding to each of the excitation vectors. The delay register contents are convolved with an estimated echo path impulse response in order to generate corresponding estimated echo signals in terms of the selected receive-input excitation vectors. The estimated echo signals are then projected onto the send-input excitation vectors in order to reduce the effect of coding distortion upon the echo-canceled signals which result from subtracting the projected echo signals from corresponding synthesized parametric components of the send-input signal. The echo-canceled signals are then combined to provide a decoded send-output signal. The echo-canceled signals are projected onto the receive-input excitation vectors and provided to an impulse response estimator for updating the estimated echo path impulse response.

BRIEF DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figures 1, 2, 3:
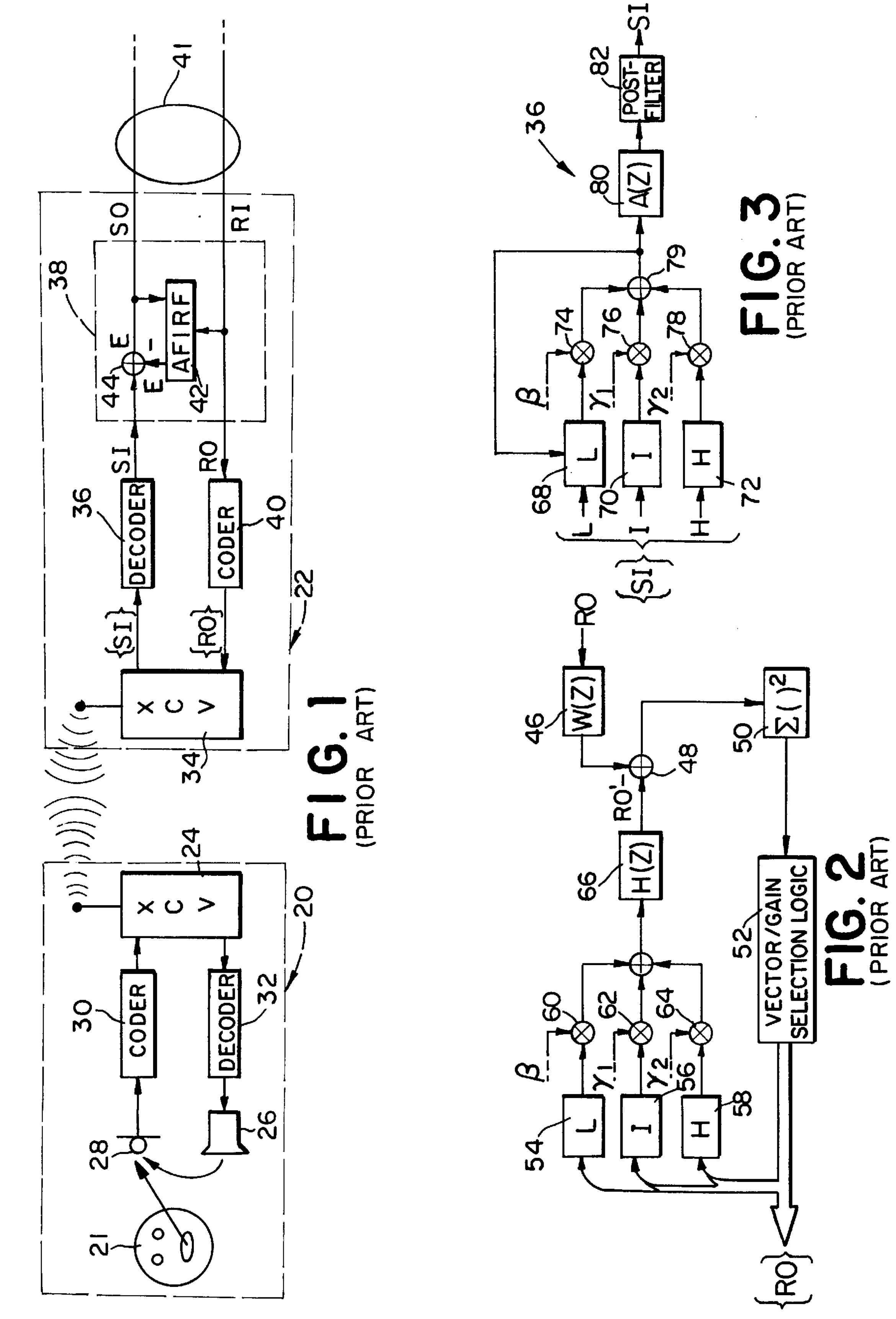
FIG. 1 (PRIOR ART)
FIG. 2 (PRIOR ART)
FIG. 3 (PRIOR ART)
FIG. 1 is a functional block diagram of a conventional mobile telecommunications system.
FIG. 2 is a functional block diagram of a VSELP speech coder.
FIG. 3 is a functional block diagram of a VSELP speech decoder.

Referring now to FIG. 1, there is shown a mobile telecommunication system. In the system shown in FIG. 1, a user 21 is equipped with a mobile station 20, such as a digital cellular telephone. The mobile station 20 includes a known radio signal transceiver 24 for maintaining radio communication with a base station 22, a loudspeaker 26 and a microphone 28. The loudspeaker 26 and the microphone 28 may be combined in a telephone handset, or may be separately positioned to provide hands-free communication.

In order to provide a large number of channels within a limited frequency allocation, the mobile telecommunications system may be of the type employing parametric speech coding in the communication path between the mobile transceiver 20 and a base station 22. The microphone is connected with a speech coder 30 for providing parametrically-coded signals to the mobile transceiver 24. A decoder 32 is connected between the mobile transceiver 24 and the loudspeaker 26 for decoding speech signals received by the transceiver 24 from the base station 22. The encoder 30 and decoder 32 are preferably configured to implement a code-excited linear prediction (CELP) coding process described in International Telecommunication Union Standard G.728 or in EIA/TIA Interim Standard IS-54 entitled "Cellular System Dual-Mode Mobile Station-Base Station Compatibility Standard", which are both incorporated by reference herein as exemplary of parametric speech coding processes.

The base station 22 transmits and receives radio signals to and from the mobile transceiver 24, and provides a 4-wire connection 41 to the public switched telephone network via switching circuitry (not shown). For purposes of description, the base station 22 is shown as comprising a radio transceiver 34, speech decoder 36, echo canceler 38 and speech coder 40. The signals received by the base transceiver 34 from the mobile transceiver 24, hereinafter designated as the encoded send-input signal, {SI}, is provided to the speech decoder 36. The speech decoder 36 produces an uncoded send-input signal, SI, in response to receiving the coded signal {SI}.

The signal received from the telephone network, designated as uncoded receive-input signal, RI, is provided as a receive-output signal, RO, to be encoded by the coder 40. In response, the coder 40 produces a coded receive-output signal {RO}, which is then provided to the transceiver 34 for transmission to the mobile station 20. For purposes of explanation, the term "uncoded" as used herein, shall include any non-parametrically coded speech, such as PCM or ADPCM speech in contrast to parametrically coded speech.

During a telephone conversation conducted by the mobile user 21, the microphone 28 will pick up the direct voice signal produced by the user 21, in addition to picking up a portion of the received speech reproduced by the loudspeaker 26. This acoustic feedback, in conjunction with the processing delays associated with multiple encoding and decoding processes, can produce a distinct and undesirable echo within the speech signal transmitted to a remote user via the telephone network. In order to reduce the echo signal, an echo canceler 38 is connected between the output terminal of the decoder 36 and the telephone network.

The basic operation of the echo canceler 38 is as follows. The receive-input signal, RI, is provided to an input terminal of an adaptive finite impulse response filter (AFIRF) 42. The RI signal is also provided as a receive-output signal, RO, to the encoder 40. The AFIRF 42 convolves the RI signal with an estimated impulse response characteristic of the echo path, and thereby generates an estimated echo signal. The SI signal from the decoder 36 is also provided to the echo canceler 38. Within the echo canceler 38, the estimated echo signal is subtracted from the SI signal, thereby providing an echo-canceled signal, or send-output signal, SO, for transmission to a remote user via the telephone network. Various types of echo cancelers are known for canceling echo from $\mu$-Law or A-Law PCM and ADPCM speech, and such cancelers are effective to attenuate echo most efficiently when there is a linear transfer function describing the echo path. However, as described further below, the speech coders 30 and 40 and the decoders 32 and 36 introduce significant non-linearities into the echo path that exists between the RO and SI terminals of the echo canceler 38.

The encoder 40 is shown in greater detail in FIG. 2, and is extensively described in the incorporated EIA/TIA IS-54 Standard. In the encoder 40, the RO signal is provided to a perceptual noise weighted filter 46 for spectrally shaping the RO signal to mask certain noise components caused by the coding process. The resulting filtered signal is provided to a summing junction 48. At the summing junction 48, a synthetic voice signal RO' is subtracted from the filtered voice signal, thereby providing an error signal to an error-measurement filter 50. The error measurement filter 50 provides a moving-average measurement of the difference between the actual and synthesized speech signals RO and RO'. The error measurement, in turn, is provided to vector/gain selection logic 52. On the basis of the measured error, the selection logic 52 selects codebook indices and associated gain factors to be employed by excitation sources 54, 56 and 58 and by amplifiers 60, 62 and 64, for producing the synthesized speech signal RO'. The three excitation sources 54, 56 and 58 comprise a long term filter 54, which is responsive to an index designated L; a first structured codebook 56, responsive to an index I; and a second structured codebook 58 responsive to an index H. When one of the codebooks is provided with an index, the codebook generates a predefined signal in accordance with a sequence of values, or excitation vector, stored within the codebook and addressable by the index (e.g., L, I, or H). In the coder 40, the long term filter index L, is chosen by the vector/gain selection logic 52 as a "best match" to minimize the error signal between the actual and synthesized speech signals. Then, the index for codebook 56 is selected to further minimize the error signal. The selection of successive codebook indices is constrained to a selection among indices corresponding to excitation vectors that are orthogonal to previously-selected vectors. Hence, the coded signal is an approximation of the original signal, and represents the first three terms of a decomposition of the input speech signal into a set of orthogonal basis functions.

The codebook selections are updated at regular intervals, e.g. every 5 ms, by the vector/gain selection logic 52. The amplifiers 60, 62 and 64 are connected to amplify the respective excitation vectors according to respective gain factors β, $\gamma_1$ and the $\gamma_2$. The resulting signals are linearly combined and provided to a weighted filter 66 to produce the synthesized speech signal RO'. The coded speech signal, {RO}, includes the codebook selection indices L, I and H, and the associated gains β, $\gamma_1$ and $\gamma_2$, all of which can be digitally transmitted at a much lower bit rate than a direct digital representation of the input speech signal RO. The coded speech signal may also comprise other parametric data.

The decoder 36 is shown in greater detail in FIG. 3. A coded signal {SI} is provided to the decoder 36 from the base station transceiver 34 in the form of codebook indices L, I and H, and gain factors β, $\gamma_1$ and $\gamma_2$. The codebook indices L, I and H are provided to respective excitation sources 68, 70 and 72 to produce corresponding excitation vectors. The excitation vectors are amplified by respective amplifiers 74, 76 and 78 in accordance with the associated gain factors β, $\gamma_1$ and $\gamma_2$. The amplified excitation vectors are then combined at summing junction 79 and synthesis filter 80, to produce a synthesized speech signal. The synthesized speech signal is then spectrally filtered by filter 82, to provide the unencoded send-input signal SI.

In the arrangement shown in FIG. 1, computation of the estimated echo signal is rendered imprecise due to the use of the non-coded RI signal as an input to the AFIRF, and by the subsequent coding and decoding operations performed along the echo path from the RO terminal to the SI terminal. First, the coder 40 selects excitation vectors that, while being a “best match” to the RI signal, vary from the actual RI signal in a non-linear manner. Then, the encoder 30 selects a “best match” to the combined speech signal from the user 21 and to the portion of the decoded RI signal that is fed back to the microphone. Hence, not only will the component of the SI signal attributable to echo be distorted relative to the RO signal by the encoder 40, but the combined signal provided to the microphone will likely be expressed by the coder 30 in terms of a different set of excitation vectors than those that were employed by coder 40 to approximate the original RO signal. Hence, a linear estimate of the echo signal, as provided by the AFIRF, will differ from the actual echo component of the SI signal in accordance with the mismatch between the excitation vectors used to encode the {RO} and {SI} signals.

A partial solution to the problem would be to connect the echo canceler 38 between the terminals conducting the {RO} and {SI} signals to the base transceiver 34, and to connect the echo canceler with appropriate codebooks for retrieving the {RI} and {SI} excitation vectors in order to perform the required convolution. Such an approach would still suffer from the mismatch between the excitation vectors encoding the respective {RI} and {SI} signals. Alternatively, an echo canceler could be deployed between the connections to the loudspeaker 26 and the microphone 28 in the mobile station 20. But, since the mobile equipment is usually privately owned and purchased by the user 21, such deployment would undesirably increase the cost of the mobile station 20 to the user.

Figures 4, 5:
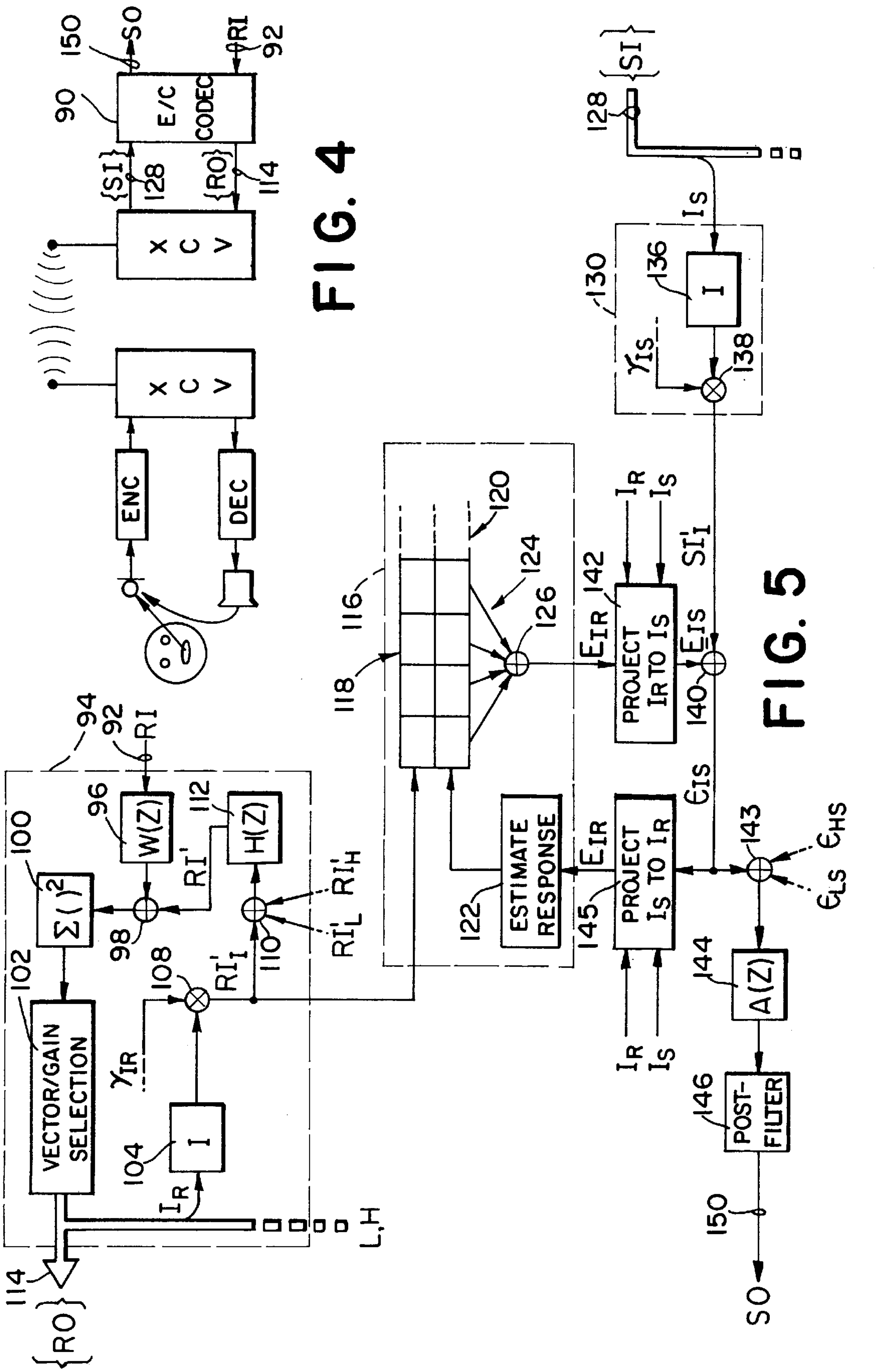
FIG. 4 is a functional block diagram of a mobile telecommunication system in accordance with the present invention.
FIG. 5 is a functional block diagram of an exemplary portion of an integrated speech coder/echo canceler for use in the telecommunication system of FIG. 4.

Referring now to FIG. 4, there is shown a telephone system arranged in accordance with the present invention. In the system of FIG. 4, the separate coder, decoder and echo canceler are replaced, relative to the system of FIG. 1, with a combined coder/canceler 90. The coder/canceler 90 is connected with a 4-wire connection to a telephone network to receive a non-coded receive-input signal RI, and to transmit a non-coded send-output SO. The coder/canceler 90 is further connected with the base transceiver to receive the coded send-input signal {SI} and to transmit the coded receive-output {RO}. The coder/canceler 90 includes a convolution processor for each component of the CELP encoded signals. In the present example, there is a convolution filter corresponding to each of the L, I and H vectors of the encoded signals.

Referring now to FIG. 5, there is shown a representative portion of the coder/canceler 90. The portion shown in FIG. 5 is operative upon the I-vector component of the respective coded signals. The remaining portions of the coder/canceler 90 are not shown, but are arranged to operate upon the remaining components of the coded signals in a substantially similar manner as described below with respect to the I-vector component. The non-coded RI signal is received from the telephone network at receive-input terminal 92. Receive-input terminal 92 connects to an input stage 94 of the canceler 90. The input-stage 94 comprises a weighted filter 96 and a summing junction 98 for subtracting a synthesized RI signal, RI', from the perceptually-filtered RI signal. The resulting error signal is provided to an error measurement filter 100, vector/gain selection logic 102, I-vector codebook 104, amplifier 108, summing junction 110 and synthesis filter 112. The speech parameters extracted by the components of the input stage, including the codebook indices and gain factors, are provided to the receive-output terminal 114 of the canceler 90 for transmission to the mobile base station as signal {RO}.

The canceler 90 includes a convolution processor for each vector component of the coding arrangement. The portion of the canceler 90 shown in FIG. 5 includes convolution processor 116. The convolution processor 116 includes a delay line or shift register 118 for holding a plurality of recent values of the I-vector component of the synthesized receive-input, here designated as $RI_1'$. The delay line 118 is coupled with a tap weight register 120 which holds a plurality of tap weights representing the estimated impulse response of the echo path. The tap weights in register 120 are periodically updated by an impulse response estimator 122, which operates according to known principles of echo cancellation.

A plurality of taps 124 are shown to be connected between the tap weight register and a summing junction 126, to represent the convolution operation performed within the convolution processor, whereby the contents of delay line 118 are multiplied by the respective tap weights in register 120, and then summed to produce a resulting convolved signal—in this instance the estimated echo signal for the I-vector component, $E_{IR}$. The subscript “IR” here is intended to denote that the estimated echo signal, $E_{IR}$, is the result of an operation performed upon the synthesized I-vector component of the speech signal developed by the input-stage coder 94 on the receive side of the canceler 90.

The coded send-input {SI} is received by the canceler 90 at send-input terminal 128, which connects to an input decoder stage 130. The input decoder stage includes codebooks for regenerating the excitation vectors corresponding to the codebook indices received within the {SI} signal. For example, the I-vector index of the {SI} signal is provided to codebook 136, and the associated gain $\gamma_1$ is received by amplifier 138 in order to produce a synthesized send-input signal $SI_1'$ corresponding to the I-vector component of {SI}. The $SI_1'$ signal is then provided to summing junction 140 for removal of the estimated echo component therefrom.

In order to perform such echo removal without also introducing a noise component due to excitation vector mismatch between the respective receive-signal encoder 94 and the send-signal decoder 130, the estimated echo signal $E_{IR}$ is reformulated in terms of the send-signal excitation I-vector by a vector projection processor 142. The vector projection processor 142 is connected to receive the estimated echo signal $E_{IR}$ from the convolution processor. The projection processor 142 is further connected to receive either the I-vector indices from the {SI} and {RO} signal terminals, as shown, or to receive the corresponding I-vectors directly from codebooks 136 and 104. At appropriate intervals, the projection processor 142 determines a projection of the $E_{IR}$ signal upon the send-signal I-vector, in order to re-express the estimated echo signal $E_{IR}$ as an estimated echo signal $E_{IS}$. Here, the "IS" subscript denotes the projection of the $E_{IR}$ signal in terms of the current I-vector associated with the send signal. The resulting estimated echo signal, $E_{IS}$, is provided to the summing junction 140 for subtraction from the synthesized $SI_1'$ signal.

After the estimated echo component has been removed from the $SI_1'$ signal, the resulting error signal, $\epsilon_{IS}$ (where the subscript denotes the I-vector for the send side) is provided to a summing junction 143 to be combined with error signals $\epsilon_{LS}$ and $\epsilon_{HS}$ associated with the L and H components of the preferred coding method, and generated by corresponding portions of the echo canceler 90. Synthesis of a non-coded SO signal is then completed by synthesis filter 145 and post-filter 146. The SO signal is then provided as an output signal at terminal 150 for connection to the telephone network.

In a conventional echo canceler, the tap weights of the convolution processor are updated on the basis of the error signal remaining after echo component removal from the send-input signal. In the coder 90, however, the contents of the delay line 118 are encoded in terms of the receive side I-vector, while the error signal, $\epsilon_{IS}$, is encoded as a function of send side I-vector. In order to maintain consistency of expression between the contents of delay line 118 and the estimated impulse response of the echo path represented by the contents of tap weight registers 120, a second projection processor 144 is connected along the feedback loop from the summing junction 140 and the impulse response estimator 122. The projection processor 144 performs a projection of the error signal $\epsilon_{IS}$ onto the present receive side I-vector, so that the echo path impulse response is computed by the impulse response estimator 122 in terms of a basis function that is consistent with the contents of delay line 118.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed. For example, while there has been described an echo canceler having a convolution processor 116 that is configured to be responsive to the receive side coder parameters, it is recognized that the convolution processor 116 could alternatively be configured to be responsive to the send side coder parameters. In such an embodiment, the two projection processors 145 and 142 would be eliminated, to be replaced by a single projection processor connected between summing junction 108 and register 118, for providing the synthesized receive side I-vector signal, $RI'_1$, in terms corresponding to the send side I-vector.

That which is claimed is:

1. An echo canceler, comprising:

a send-input terminal for receiving a coded send-input signal having a first parametric index;

a decoder connected with the send-input terminal for synthesizing a parametric component of the send-input signal on the basis of the first parametric index;

a receive-input terminal for receiving a non-coded receive-input signal;

a parametric coder connected with the receive-input terminal for determining a parametric component of the receive-input signal, and for selecting a second parametric index for indicating the determined parametric component;

a convolution processor for convolving the parametric component of the receive-input signal with an estimated echo impulse response to provide an estimated echo signal;

projection means responsive to the first and second parametric indices, and to the estimated echo signal, for projecting the estimated echo signal onto the parametric component of the send-input signal to provide a projected estimated echo signal;

removal means for removing the projected estimated echo signal from the synthesized parametric component of the send-input signal to provide an error signal; and a send-output terminal connected with the removal means for transmitting the error signal from the echo canceler.

2. The echo canceler of claim 1, comprising:

a receive-output terminal for transmitting the selected parametric index from the echo canceler.

3. A method of processing a parametrically-encoded telecommunication signal for transmission from a near end station to a far end station, comprising steps of:

receiving the parametrically-encoded signal at a send-input terminal;

receiving a non-parametrically-encoded signal at a receive-input terminals;

parametrically encoding the non-parametrically-encoded signal as a plurality of parametric components to provide an encoded receive-output signal at a receive-output terminal;

providing at least one parametric component of the receive-output signal to a convolution processor;

estimating an echo path impulse response between the receive-output and send-input terminals;

synthesizing a component of the parametrically-encoded signal corresponding to said one component of the encoded receive-output signal;

convolving said impulse response with said one component of the encoded receive-output signal to provide a first estimated echo signal;

projecting the first estimated echo signal onto the parametric component of the synthesized signal to provide a second estimated echo signal;

removing the second estimated echo signal from the synthesized signal to provide an error signal; and transmitting the error signal to the far end station.

4. An integrated parametric codec and echo canceler, comprising:

a parametric encoder having an input terminal for receiving a first non-coded signal, a processing section for encoding the non-coded signal as a plurality of parametric signals, a synthesizer for producing a first synthesized signal in response to one of said parametric signals having a first parameter, and an output terminal for transmitting said parametric signals;

a parametric decoder having an input terminal for receiving a parametrically-encoded signal having a second parameter, and configured for responsively producing a second synthesized signal;

a convolution processor for generating an estimated echo signal on the basis of said first and second synthesized signals;

conversion means for converting one of (i) said first synthesized signal in terms of said second parameter, and (ii) said estimated echo signal in terms of said second parameter; the conversion means connected with the convolution processor to provide said estimated echo signal in terms of said second parameter; and removal means for removing the estimated echo signal from the second synthesized signal.

* * * * *

UNITED STATES PATENT AND TRADEMARK OFFICE

CERTIFICATE OF CORRECTION

PATENT NO. : 5,857,167

DATED : January 5, 1999

INVENTOR(S) : GRITTON, BASBUG and LU

It is certified that error appears in the above-identified patent and that said Letters Patent is hereby corrected as shown below:

On the title page,

[75] "Inventors": delete "Mclean, both" and insert -McLean and Lu, Youhong, Sterling, all of Va.--.

[73] Assignee"; delete "Coherant" and insert --Coherent--.

Signed and Sealed this

Eighth Day of June, 1999

Attest:

Q. TODD DICKINSON

*Attesting Officer* *Acting Commissioner of Patents and Trademarks*